T. A. KILLMAN.
PANORAMIC MOTION PICTURE APPARATUS.
APPLICATION FILED MAY 6, 1916.
1,347,103.
Patented July 20, 1920.
3 SHEETS—SHEET 1.
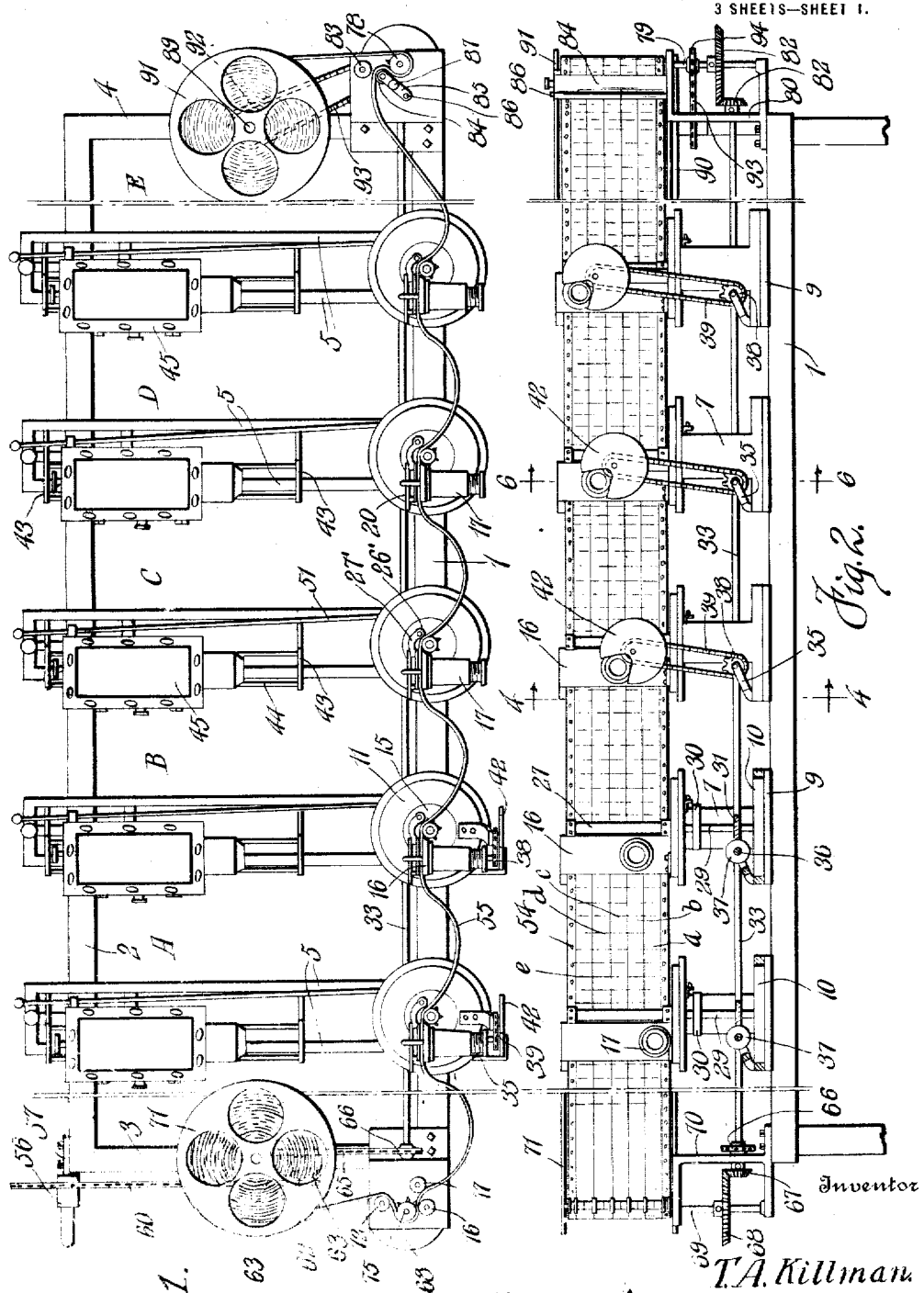

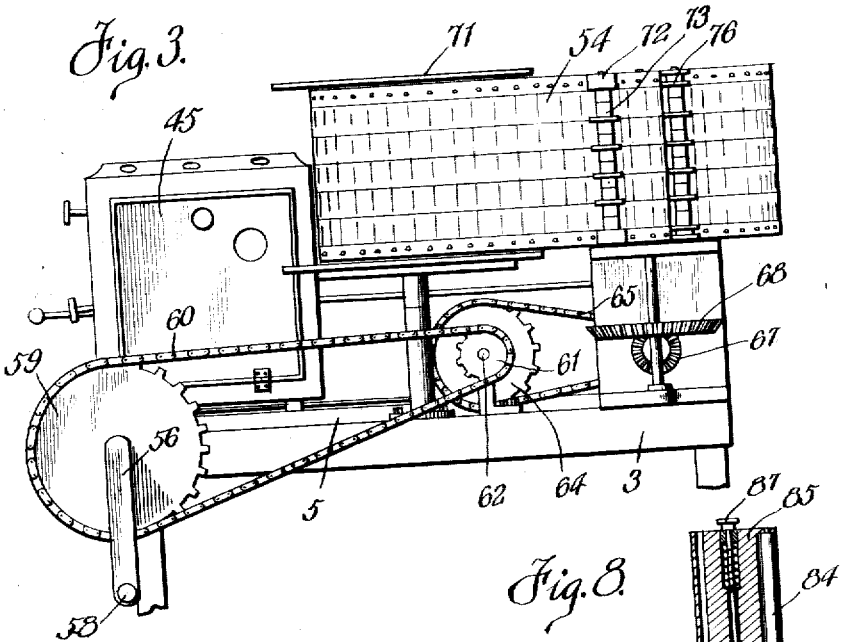

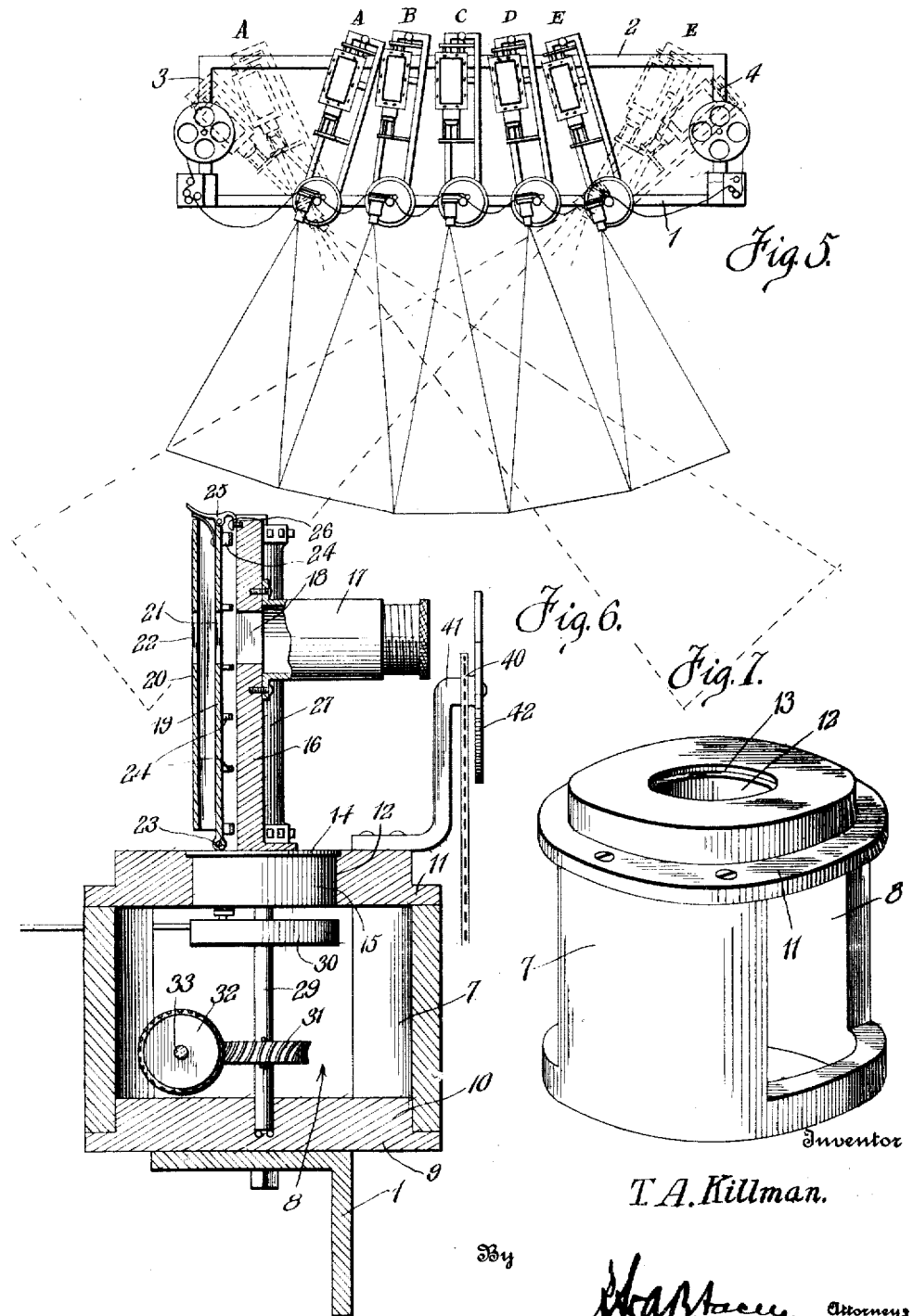

UNITED STATES PATENT OFFICE.
===

THOMAS A. KILLMAN, OF NASHVILLE, TENNESSEE, ASSIGNOR TO INTERNATIONAL MOVING PICTURE AND FILM COMPANY, OF NASHVILLE, TENNESSEE, A CORPORATION OF TENNESSEE.

PANORAMIC-MOTION-PICTURE APPARATUS.

1,347,103.        Specification of Letters Patent.        Patented July 20, 1920.

Application filed May 6, 1916. Serial No. 95,904.

*To all whom it may concern:*

Be it known that I, THOMAS A. KILLMAN, a citizen of the United States, residing at Nashville, in the county of Davidson and State of Tennessee, have invented certain new and useful Improvements in Panoramic-Motion-Picture Apparatus, of which the following is a specification.

This invention relates to apparatus for the taking and projection of panoramic motion pictures and it is one aim of the invention to provide apparatus of this class which may be employed both as a panoramic motion picture camera and as means for projecting panoramic motion pictures.

The apparatus, in either instance, employs but a single length of film and embodies a plurality of lens sets for the photographic impression upon a negative film, when the apparatus is employed as a camera, or a plurality of series of view sections the corresponding view sections of each series constituting the composite panoramic view, the corresponding ones of the several series of view sections, when the apparatus is employed for the projection of the views, being projected through the lens sets onto the screen in proper registration to present to view the complete or composite picture.

It is one aim of the invention to provide for independent adjustment of the several lens sets whereby the lens sets may be relatively angularly adjusted so as to cover a field of greater or less area as may be desired and yet to so construct the apparatus that the same as a whole will be compact although capable of an exceptionally wide range of adjustment of the said lens sets for the purpose stated.

So far as concerns the use of the apparatus in the projection of panoramic motion picture views, the invention aims to provide each lens set with a corresponding source of light supply so that the entire view may be evenly and highly illuminated regardless of the relative positions to which the several lens sets are adjusted.

Another aim of the invention is to provide in connection with each lens set, means for intermittently feeding the film through the film gate associated with the said set and to provide means for actuating the several intermittent film feeding mechanisms in synchronism so that while the composite view is projected onto the screen in sections which properly register to make up the composite view, the fact that the said view is projected in sections will not be discernible.

In the accompanying drawings:

Figure 1 is a plan view of the apparatus embodying the present invention;

Fig. 2 is a front elevation thereof;

Fig. 3 is an end elevation of the apparatus;

Fig. 4 is a vertical sectional view on the line 4—4 of Fig. 2;

Fig. 5 is a semi-diagrammatic view, illustrating the manner of using the apparatus in the projection of a panoramic motion picture;

Fig. 6 is a vertical sectional view on the line 6—6 of Fig. 2;

Fig. 7 is a perspective view of a portion of the apparatus;

Fig. 8 is a vertical sectional view through a portion of the apparatus.

Corresponding and like parts are referred to in the following description and indicated in all the views of the accompanying drawings by the same reference characters.

The mechanism embodying the apparatus is mounted upon a suitably constructed frame and the mechanism is more or less completely inclosed within a casing which in all of the views of the drawings has been omitted so as to better illustrate the invention, and the said frame includes a front member 1, a rear member 2, and ends 3 and 4.

Mounted upon the frame of the apparatus is a battery of projection devices indicated in general by the reference letters, A, B, C, D and E and while five such devices are illustrated in the drawings, it will be understood that this number may be increased or decreased as may be found desirable and inasmuch as these devices are of counterpart construction, a specific description of one will suffice for all.

Each of the projecting devices includes a lens set, mechanism for intermittently feeding the film past the lens set, and a source of light supply, such for example as the ordinary lamp house employed in motion picture projection apparatus and the several component parts of each projection device are mounted upon a frame including side members indicated by the numeral 5, these side members being suitably spaced and being connected at their forward ends as at 6 with the lower portion of a supporting frame structure which is clearly shown in Fig. 7 of the drawings. This frame structure comprises a cylindrical body 7 having openings 8 in its opposite sides, the body being open at its lower end and being rotatably fitted upon a supporting base 9 having an upstanding boss 10 which is surrounded by the said lower end of the body. The base 9 is fixedly mounted upon the forward member 1 of the frame of the apparatus and these bases are suitably spaced along the said member of the frame as clearly shown in Figs. 1 and 2 of the drawings. The body 7 may be closed at its top or provided with a top 11 secured thereto in any suitable manner and this member is provided centrally with an opening 12 the wall of which opening is provided at the upper surface of the said top member 11, with a circumscribing seat 13 receiving a circumscribing flange 14 at the upper end of a casing 15 which contains mechanism for imparting intermittent motion to the film and which mechanism may be in the nature of the ordinary Geneva movement or of any other mechanical construction found suitable for the purpose, and inasmuch as in itself it constitutes no part of the present invention it is neither specifically illustrated nor will it be specifically described.

Mounted in upright position upon the upper face of the top 11 of the supporting frame structure 7 is the back plate 16 of a lens box which box is indicated by the numeral 17 and contains the usual projecting lens set, the rear end of the box registering with an opening 18 formed in the said back plate 16. The film gate includes a plate 19 and a protecting plate 20 which plates are provided with oppositely located openings 21 and 22 respectively, and these plates are suitably connected with the plate 20 located in the rear of the plate 19 and suitably spaced therefrom, and by reference to Fig. 6 of the drawing it will be observed that light rays may pass from the lamp house through the openings 22 and 21 and through the opening 18 to the lens box 17. The plate 19 is hinged at its lower edge as at 23 at the bottom of the back plate 16 and consequently the said plate 19 may be swung downwardly so as to permit of the introduction of the film into the film gate, the film being passed across the rear face of the back plate 16 and being held flat thereagainst through the medium of bowed springs 24 carried by the forward face of the said plate 19 which springs bear against the rear face of the film and serve to hold the film against the rear face of the back plate 16 in the manner stated.

The film gate is held closed by means of a suitable latch 25 carried by the plate 19 at the upper edge thereof and coacting with a suitable keeper 26 at the upper edge of the back plate 16. The intermittent film sprocket for moving the film intermittently through the film gate is indicated in general by the numeral 27 and this sprocket is fixed upon a shaft 28 which is intermittently rotated through the medium of the Geneva movement inclosed within the casing 15, the said shaft extending axially through the top of the said casing as will be readily understood. In order that the film may be properly held in engagement with the film sprocket 27, the gate 19 is provided at one vertical edge with laterally extending bracket arms 27' supporting between them an idle roll 26'.

The numeral 29 indicates a shaft which is to transmit motion to the Geneva movement contained within the casing 15 and this shaft is provided with a suitable balance wheel 30 suitably located below the said casing 15 and below the balance wheel has fixed upon it a worm gear 31 which meshes with a worm gear 32 fixed upon a shaft 33. The shaft 33 constitutes a common power transmitting means for all of the shafts 29 as will be understood by reference to Fig. 2 of the drawings and the said shaft is driven in a manner to be presently described, and it will be understood that inasmuch as it does constitute a common power transmitting means for all of the said shafts 29, the shafts 29 will be rotated in synchronism and the several Geneva movements will be synchronously actuated to in a like manner feed the film through the several film gates.

Mounted as at 34 upon the supporting frame structure 7 is a bearing bracket 35 in which is rotatably mounted a shaft 36 and this shaft has fixed upon it a worm gear 37 meshing with the respective worm gear 31 and also fixed upon the said shaft at the forward end thereof is a sprocket gear 38 about which is trained a sprocket chain 39, the said chain passing also about a sprocket gear 40 rotatably mounted upon a bracket 41 fixed upon the top 11 of the frame structure 7 and connected for rotation with a segmental shutter 42 of the ordinary type employed in motion picture apparatus and it will now be understood that as the shaft 33 rotates, motion will be imparted to the Geneva movement for intermittently advancing the film through the film gate and at the same time motion will be transmitted to the shutter 42 so as to provide for the proper periods of illumination and occultation essential in the projection of the views.

As before stated, an individual source of light supply is provided for each lens set and, as illustrated in the drawings, upstanding brackets 43 are fixed upon the spaced members 5 of each of the several frames which support the projection devices and these brackets 43 support rods 44 which in turn support a lamp house indicated by the numeral 45, the said lamp house being of the ordinary construction employed in motion picture apparatus. It will now be observed and particularly by reference to Figs. 1 and 5 of the drawings that the lamp houses and lens boxes are in direct alinement and it will be understood that regardless of the positions to which the frames 5 are adjusted the light rays from the lamp houses will pass directly to the respective lens boxes. In order that the frames 5 may be held at the desired angular adjustment any suitable means may be provided and, as shown in Fig. 4 of the drawings, a post 46 projects downwardly from each frame 5 and has pivoted to it a clamping bar 47 which extends beneath and coacts with the under side of the rear frame member 2, the rear end of the bar carrying an upstanding stem 48 which is threaded at its upper end as at 49 and has fitted thereon a thumb nut 50 which may be tightened so as to bear against the upper side of the rear end of the respective frame 5. Thus when it is desired to adjust one of the frames the nut 50 may be loosened and the frame then swung to the right or left to secure the desired adjustment after which the nut is tightened for the purpose of holding the frame securely against displacement.

By reference to Figs. 2 and 4 of the drawings it will be observed that the lens boxes 17 are arranged in stepped relation or, in other words, located at successively higher elevations from one end of the battery to the other and it will also be observed by reference to Fig. 2 that the film which is indicated by the numeral 54, assuming the film to be a positive film from which the pictures are to be projected, bears a plurality of series of picture areas each area constituting a section of the composite panoramic view and these several series of picture areas are indicated by the reference letters a, b, c, d and e and are to be projected respectively by the projection devices A, B, C, D and E of the battery heretofore described. It will be understood of course that the picture areas of the several series upon the film for the corresponding areas which are to be simultaneously projected, are properly relatively spaced throughout the length of the several series and that the space between the said areas of the several series is such that the film may be provided with loops of ample length as indicated at 55, between the several adjacent projection devices so as to permit of relative adjustment of the said devices angularly without disturbing the sequence of the areas to be projected.

The means for transmitting rotary motion to the shaft 33 will now be described. The numeral 56 indicates a crank shaft which is mounted in a suitable bearing 57 at the rear right hand corner of the frame of the machine and carries a crank handle 58 by means of which it may be rotated and fixed upon this shaft is a sprocket gear indicated by the numeral 59 about which is trained a sprocket chain indicated by the numeral 60, this chain being also trained about a sprocket gear 61 which is fixed upon a shaft 62 mounted in a suitable bearing 63 upon the end member 3 of the said frame. Also fixed upon this shaft 62 is a larger sprocket gear indicated by the numeral 64 about which is trained a sprocket chain 65 the chain passing also over a sprocket gear 66 fixed upon the right hand end of the shaft 33. This end of the shaft 33 also has fixed upon it a bevel pinion 67 which meshes with a bevel gear 68 fixed upon a vertical shaft 69 mounted in a bearing bracket 70. The numeral 71 indicates the storage reel for the film and this reel is mounted, as is shown, for free rotary movement. From the reel the film 54 is led around a roller 72 which comprises a series of freely rotatable idle sections 73 mounted upon a spindle 74. The film is then passed around a film sprocket 75 and between the said sprocket and an idle roll 76. The film is also passed between the roll 76 and a peeler roll 77 which insures against the disengagement of the film from the teeth of the film sprocket 75. The film is then passed through the film gates of the projecting devices comprising the battery and after leaving the film gate of the projection device E is passed about a film sprocket 78. The film sprocket 78 is fixed upon a shaft 79 mounted in a suitable bearing bracket 80 at the left hand end of the supporting frame of the apparatus and this shaft also carries a bevel gear 81 with which meshes a pinion 82 upon the shaft 33 and the pinion and gear serve to transmit motion from the shaft 33 to the shaft 79. The film 54 before passing about the film sprocket 78 passes between an idle roll 83 mounted upon the bracket 80 and a roll 84 which is mounted in a suitable frame 85 in turn mounted for swinging movement as at 86 upon the said bracket and this frame is held in position to cause the roll 84 to hold the film in proper relation to the film sprocket 78 by means of a spring-pressed latch rod 87 which is mounted vertically within the frame 85 and seats at its lower end in an opening 88 in the upper side of the said bracket 80. In passing the film about the sprocket 78, the latch rod 87 is drawn upwardly to disengage its lower end from the opening 88 and the frame 85 is then swung from the film sprocket 78 to permit of such passage of the film after which the frame is swung back to normal position as shown in Fig. 1 of the drawings whereupon the latch rod 87 will be moved outwardly through the influence of the spring associated therewith and its lower end will seat in the said opening 88 thereby holding the frame in proper position for the coöperation of the roll 84 with the film. The numeral 89 indicates a shaft which is vertically mounted upon the frame of the apparatus and which has fixed upon it a flat circular supporting head 90 and removably fitted upon this shaft 89 and resting frictionally at its lower end against the upper surface of the said head 90 is the take-up reel of the apparatus which reel is indicated by the numeral 91. The shaft is rotated through the medium of a sprocket gear 92 fixed thereon and a sprocket chain 93 which is trained about the said gear and about a sprocket gear 94 which is fixed upon the shaft 79.

As before stated, the apparatus embodying the present invention may be employed either as a camera or for the projection of motion pictures and when employed as a camera the lamp houses are of course to be removed so as to decrease the weight of the apparatus and render the same less bulky.

As heretofore stated, the frames 5 are independently angularly adjustable and in taking or projecting the panoramic pictures the frames supporting the projection devices A and E will have their rear ends swung inwardly toward the center of the apparatus as for example as shown in Fig. 5 of the drawings so as to cause the lens sets of the respective devices to be presented laterally at an angle with relation to the front to rear median line of the apparatus, the frame supporting the projection devices B and D being likewise adjusted but to an extent at a lesser angle and the frame supporting the projection devices being allowed to remain in the position shown in Figs. 1 and 5 of the drawings. Thus in the use of the apparatus as a camera, the negative film will have photographically impressed upon it view sections comprising the composite panoramic view toward which the apparatus is presented and likewise, in the use of the apparatus for projecting the views, the several view sections will be projected onto the screen in registration and to present the composite or complete panoramic view. Should it be desired to take or project a panoramic view covering an exceptionally wide area, the frame carrying the projection devices A may be adjusted so that its lens set will be presented at a sharp angle toward the left hand end of the apparatus and the frame carrying the projecting devices E may be so adjusted as to cause the lens set thereof to be presented at a sharp angle toward the right hand side of the apparatus, the frames supporting the projection devices B and D being likewise adjusted but at less acute angles and the frame supporting the projection devices C being allowed to remain in the position shown in Fig. 1 of the drawings. In other words, the rear ends of the frames may be moved toward or away from each other to any extent to effect the desired adjustments.

Having thus described the invention, what is claimed as new is:

1. In panoramic motion picture apparatus, a plurality of lens sets, means whereby the sets may be relatively angularly adjusted, and means for feeding a single strip of film past all of the lens sets collectively.

2. In panoramic motion picture apparatus, a plurality of lens sets, means whereby the sets may be relatively angularly adjusted, and means for synchronously feeding a single strip of film past all of the lens sets collectively.

3. In panoramic motion picture apparatus, a plurality of lens sets, means whereby the sets may be relatively angularly adjusted, the sets being arranged in relative stepped relation, and means for feeding film past the several lens sets, each lens set being arranged for coaction with a distinct longitudinal series of picture areas embraced in the film.

4. In panoramic motion picture apparatus, film storage and film take up reels, a plurality of projection apparatuses arranged in a series between the reels and each including an intermittent film feeding device and a projecting lens set, each feeding device including a shaft to be driven to impart motion to the said device, a drive shaft extending along the series of projection apparatuses, gear connection between the drive shaft and each of the last-mentioned shafts, means driven from the drive shaft for feeding film from the storage reel, and means driven from the said driven shaft for feeding the film on to the take up reel.

5. In panoramic motion picture apparatus, film storage and take up means, a series of projection apparatuses, past which the film is to be moved, each apparatus including an intermittent film feeding mechanism and a lens set, each film feeding mechanism including an actuating shaft to be driven, means for actuating all of said shafts in synchronism, and means supporting the several lens sets of the series for relative angular adjustment each about an independent axis.

In testimony whereof I affix my signature.

THOMAS A. KILLMAN.